(No Model.)
A. G. ALLEN.
LUBRICATING DEVICE.
No. 575,141.  Patented Jan. 12, 1897.
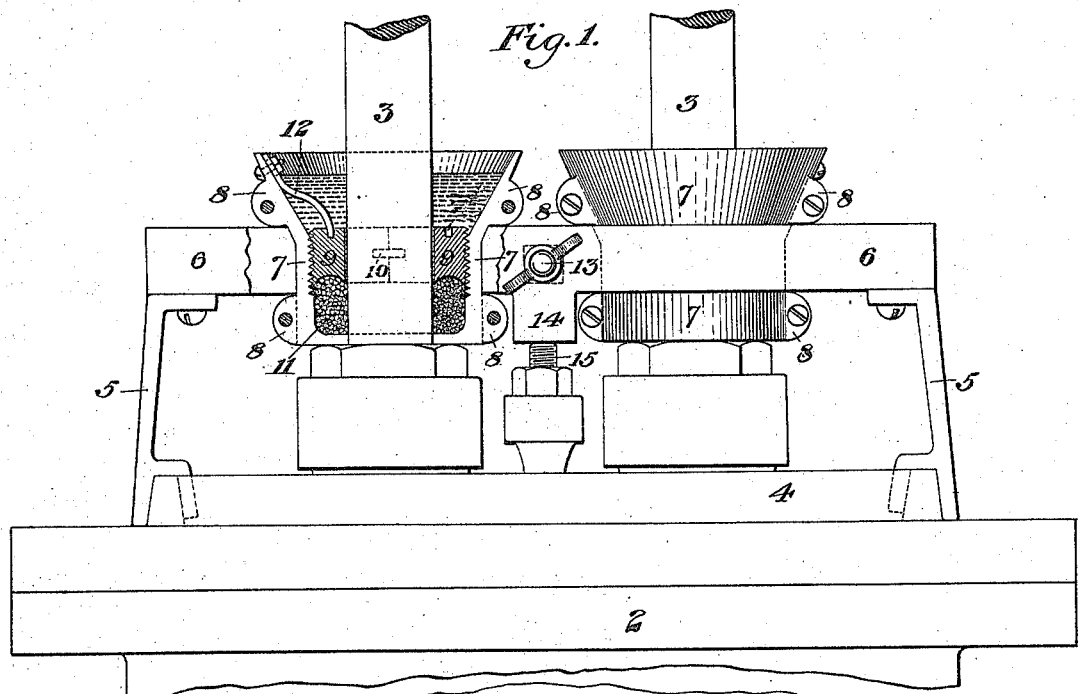
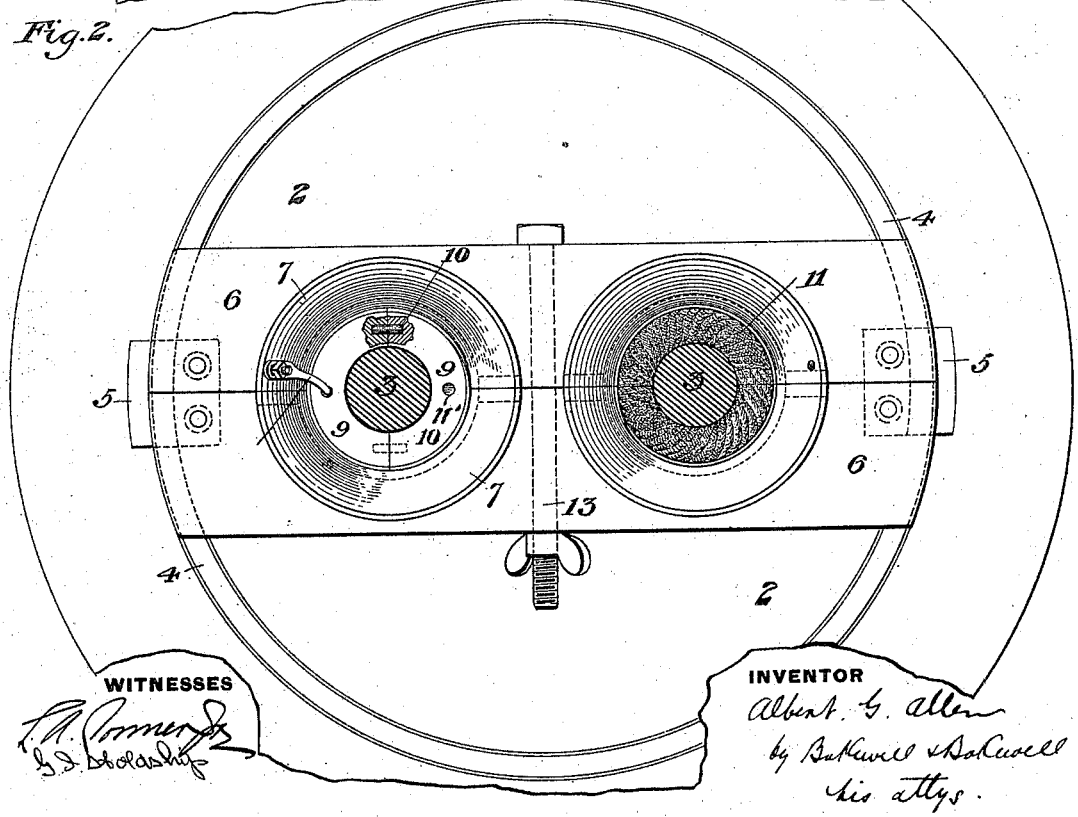
WITNESSES
INVENTOR
Albert G. Allen
by Bakewell & Bakewell
his attys.

UNITED STATES PATENT OFFICE.

ALBERT G. ALLEN, OF PITTSBURG, PENNSYLVANIA.

LUBRICATING DEVICE.

SPECIFICATION forming part of Letters Patent No. 575,141, dated January 12, 1897.

Application filed September 10, 1896. Serial No. 605,459. (No model.)

*To all whom it may concern:*

Be it known that I, ALBERT G. ALLEN, of Pittsburg, in the county of Allegheny and State of Pennsylvania, have invented a new and useful Improvement in Lubricating Devices, of which the following is a full, clear, and exact description, reference being had to the accompanying drawings, forming part of this specification, in which—

Figure 1 is a side elevation, partly in section, of my improved lubricator in place upon the cylinder-head of an elevator-cylinder; and Fig. 2 is a top plan view of the same, partly broken away.

My invention relates to the lubricating of piston-rods of vertical cylinders, more especially the hydraulic cylinders employed in elevator installations, and is designed to provide an improved device for this purpose which shall continuously lubricate the rod and also wipe the surplus from the same and prevent the lubricating liquid from passing out of the reservoir, while leaving sufficient lubricant on the rod to oil the packing in the cylinder-gland.

In the drawings, 2 represents the head of a hydraulic cylinder having two vertical piston-rods 3 3 passing therethrough. This head is provided with a projecting rim 4, which is engaged by the lower forked ends of supports 5 5, upon which is carried a plate 6. This plate 6 is made in two halves, being divided longitudinally, and each half is provided with two semicircular recesses, which, when the two halves are placed together, form two holes through which the piston-rods 3 3 pass. In each hole is secured a lubricating device, which consists, preferably, of a brass casting made in two similar halves 7 7, which are secured together by suitable screws passing through registering lugs 8 8. These two halves when joined together form a reservoir surrounding the piston-rod, the lower end of the reservoir or cup fitting closely about the piston-rod. The intermediate cylindrical portion of the inner surface of the reservoir is screw-threaded, the screw-threads being engaged by similar threads upon a screw-plug 9, which forms a dividing-partition, and is also made in two similar halves, which are placed about the rod and secured together by suitable dowel-pins 10 10. In the bottom of the lubricator I place a coil 11 of rope material, preferably hemp yarn. The screw-plug is then screwed down by means of a suitable spanner engaging holes 11' in the screw-plug, so that it presses upon the coil of yarn. A keeper 12, consisting of a bent pin having a slotted shank secured to the upper portion of the reservoir, is then inserted in one of the holes 11' to hold the screw-plug in its adjusted position, and the lubricating liquid being poured into the upper open flaring portion of the reservoir rests therein in contact with the piston-rod. The two parts of the plate 6 are secured together by a screw-bolt 13, passing therethrough, and the plate is preferably provided with a depending lug 14, which rests upon a bolt 15 in the cylinder-head.

The operation of the device is apparent, each of the rods receiving a coating of oil or other lubricant as it passes upwardly through the reservoir, while on its downward stroke this coating is wiped off by the rope packing 11, thus effectually oiling the rod, while at the same time the surplus lubricant is wiped off by the coil of yarn, which seals the bottom of the reservoir and allows sufficient oil to remain on the rod for the purpose of oiling the cylinder-gland.

The advantages of my invention are numerous, the lubricator-plate being preferably made of a heavy metal, such as a mixture of lead and Babbitt metal, and merely resting upon the top of the cylinder-head is held in place merely by its own weight, and thus any side movements of the piston-rod will not jam or injure the same, the device moving sidewise with any such movement of the rod. The plate, the reservoirs or cups, and the screw-plug, being made in separate halves, may be easily and quickly secured about the piston-rod without removal or disturbance of any of the parts. This piston rod or rods are continuously supplied with a liquid lubricant, while at the same time the downflow of lubricant from the cup is prevented by the coiled rope, which acts also as a wiper and somewhat as an oiler for the piston-rod. The device is simple and not liable to get out of order and may be cheaply made.

It is apparent that the legs or supports 5 5 may be done away with, the plate 6 resting upon the bolt 15 or some plate secured thereto, and that the plate may rest upon any other portion of the cylinder-head or its attachments. The partition 9 may be made integrally with the parts of the cup and the specific form of the reservoir. The plate and other parts may be also varied without departing from my invention, since

I claim—

1. A lubricator for vertical reciprocatory rods, comprising a cup formed in longitudinally-separated parts, and surrounding the rod, a rope packing in the bottom of the cup, a separating-partition surrounding the rod above the packing, a liquid-reservoir above the partition, and means for holding the lubricator against vertical movement; substantially as described.

2. A lubricator for vertically-reciprocating rods, comprising a cup made in two halves and arranged to fit at its lower end snugly about the rod, a screw-plug made in two halves and arranged to surround the rod at an intermediate point in the cup, the space below the plug being arranged to receive a packing, while the space above the plug is arranged to act as a receptacle of a liquid lubricant, and means for normally holding the lubricator against vertical movement; substantially as described.

3. A lubricator for vertical piston-rods, comprising a plate arranged to rest loosely upon the head of a cylinder, a cup or reservoir held in said plate and surrounding the piston-rod, a rope packing in the lower portion of the cup, a screw-plug surrounding the rod above the packing, and a reservoir for liquid above the screw-plug; substantially as described.

4. A lubricator for vertical piston-rods, comprising a plate made of two halves and arranged to rest loosely upon the cylinder-head, a cup made in divided parts, seated within the plate and surrounding the rod, rope packing in the lower portion of the cup, and a plug above the packing; substantially as described.

5. A lubricator for vertically-reciprocating piston-rods, comprising a cup made in two halves and arranged to be clamped about the rod, a rope packing in the lower portion of the cup, a screw-plug made in separated parts and arranged to be screwed into the cup above the packing, and a keeper arranged to hold the screw-plug in place; substantially as described.

In testimony whereof I have hereunto set my hand.

ALBERT G. ALLEN.

Witnesses:
F. E. GAITHER,
H. M. CORWIN.